(12) United States Patent  
Hamnvik

(10) Patent No.: US 11,426,919 B2
(45) Date of Patent: Aug. 30, 2022

(54) METHOD AND APPARATUS FOR PREPARING A LINER FOR A COMPOSITE PRESSURE CONTAINER

(71) Applicant: Hexagon Ragasco AS, Raufoss (NO)

(72) Inventor: Per Vidar Hamnvik, Gjøvik (NO)

(73) Assignee: HEXAGON RAGASCO AS, Raufoss (NO)

( * ) Notice: Subject to any disclaimer, the term of this patent is extended or adjusted under 35 U.S.C. 154(b) by 0 days.

(21) Appl. No.: 16/651,748

(22) PCT Filed: Sep. 25, 2018

(86) PCT No.: PCT/EP2018/075960
§ 371 (c)(1),
(2) Date: Mar. 27, 2020

(87) PCT Pub. No.: WO2019/068518
PCT Pub. Date: Apr. 11, 2019

(65) Prior Publication Data
US 2020/0230862 A1    Jul. 23, 2020

(30) Foreign Application Priority Data
Oct. 3, 2017    (EP) .................................... 17194547

(51) Int. Cl.
*B29C 49/42* (2006.01)
*B29C 49/04* (2006.01)
(Continued)

(52) U.S. Cl.
CPC .......... *B29C 49/4252* (2013.01); *B29C 49/04* (2013.01); *B29C 49/4817* (2013.01); *B29C 49/50* (2013.01); *B29L 2031/7158* (2013.01)

(58) Field of Classification Search
CPC . B29C 49/50; B29C 49/4817; B29C 49/4252; B29C 49/04; B29L 2031/7158
See application file for complete search history.

(56) References Cited

U.S. PATENT DOCUMENTS 3,428,722 A    2/1969 Chittenden et al.
3,919,374 A *  11/1975 Komendowski ........ B29C 49/20
                                         264/515
(Continued)

FOREIGN PATENT DOCUMENTS

CN    1130125      9/1996
CN    101858432    10/2010
(Continued)

OTHER PUBLICATIONS

International Search Report dated Jan. 30, 2019 in International (PCT) Application No. PCT/EP2018/075960.
(Continued)

*Primary Examiner* — Monica A Huson
(74) *Attorney, Agent, or Firm* — Wenderoth, Lind & Ponack, L.L.P.

(57) ABSTRACT

Blow moulding a container, including extruding a tube shaped, hollow, elongated parison from an extrusion head having one free end; and closing a moulding equipment around the parison. The moulding equipment includes a moulding cavity and at least one aperture providing an opening into the moulding cavity from outside the moulding equipment. An excess section of the parison is arranged inside the at least one aperture. The free end of the parison is kept in place in the moulding equipment opposite the at least one aperture. The method includes holding the excess section of the parison within the at least one aperture via a holding force; cutting the parison outside the equipment, thereby providing an open end; arranging a blow pin to close the open end of the parison; and blowing pressurised gas from the blow pin into the parison, thereby forming a blow moulded container within the moulding cavity.

17 Claims, 6 Drawing Sheets

(51) Int. Cl.
  *B29C 49/48* (2006.01)
  *B29C 49/50* (2006.01)
  *B29L 31/00* (2006.01)

(56) References Cited

U.S. PATENT DOCUMENTS

| | | | |
|---|---|---|---|
| 5,217,729 | A | 6/1993 | Terauchi et al. |
| 5,866,061 | A | 2/1999 | Miyamoto et al. |
| 2005/0121034 | A1 | 6/2005 | Kennedy et al. |
| 2010/0255234 | A1 | 10/2010 | Koetke |
| 2017/0246791 | A1 | 8/2017 | Gårdsrud et al. |

FOREIGN PATENT DOCUMENTS

| | | |
|---|---|---|
| DE | 10 2012 107 045 | 2/2014 |
| EP | 0 713 827 | 5/1996 |
| JP | 03246023 | 11/1991 |
| JP | 5904255 | 3/2016 |
| JP | 2016-083872 | 5/2016 |
| WO | 2006/000329 | 1/2006 |
| WO | 2014/124909 | 8/2014 |

OTHER PUBLICATIONS

Extended European Search Report dated Mar. 15, 2018 in European Application No. 17194547.0.
English Translation of Office Action dated Jun. 23, 2021 in corresponding Chinese Patent Application No. 2018800637675.
English Translation of Search Report dated Aug. 27, 2021 in corresponding Taiwanese Patent Application No. 107133986.
Examination Report dated Mar. 10, 2022 in Indian Patent Application No. 202017012132.

* cited by examiner

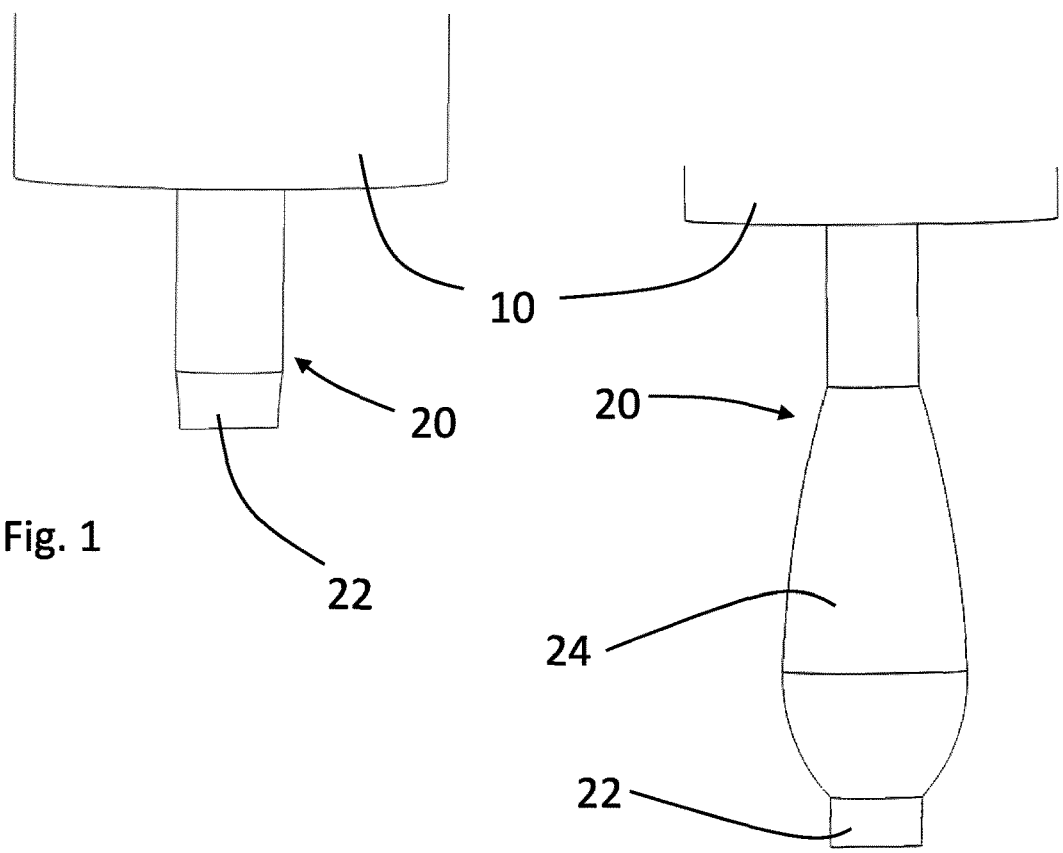
Fig. 1
Fig. 2
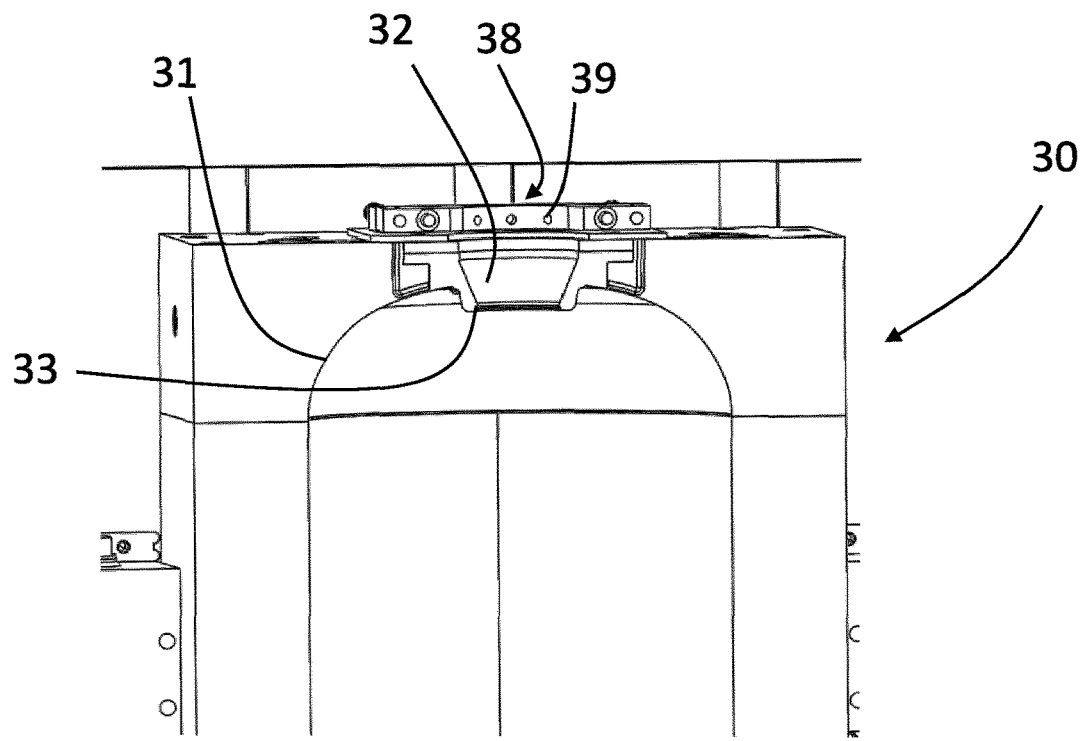
Fig. 3

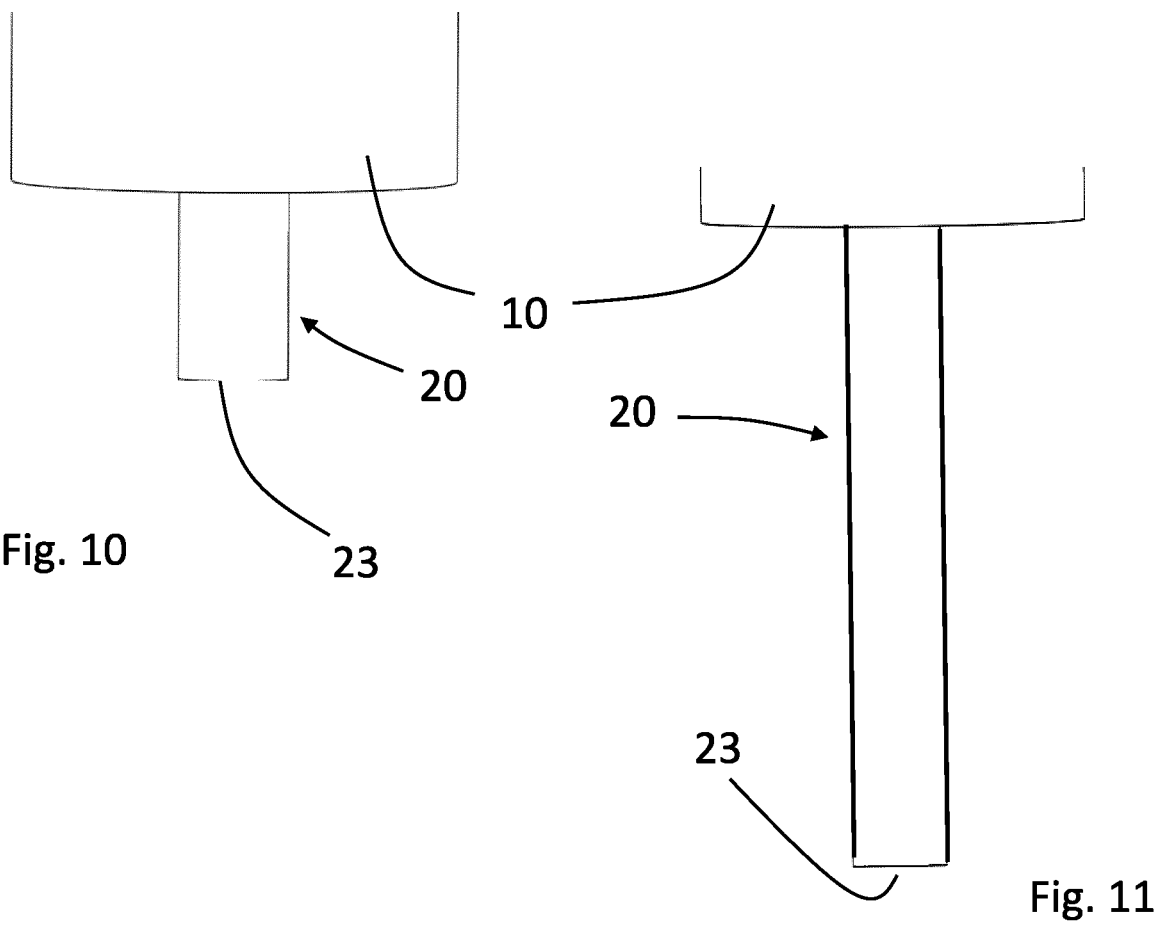

METHOD AND APPARATUS FOR PREPARING A LINER FOR A COMPOSITE PRESSURE CONTAINER

The present invention relates to a new method and apparatus for preparing a liner for a composite pressure container, especially the present invention relates to a method and apparatus for preparing a liner without a pinch line in the area surrounding an opening of the liner.

BACKGROUND

A common type of composite pressure containers consists of an internal fluid tight liner, at least one boss connected thereto for installation of a valve, safety device, or similar connection devices for filling or emptying of the container. The boss is arranged surrounding an opening in the liner such that the connection devices installed in the boss are connected to the internal volume of the liner. On the outside of the liner one or more reinforcement layers are arranged to provide the container with the necessary strength to store fluid under a desired pressure. These types of containers are for instance disclosed in WO00/66939 and WO98/34063 where the reinforcement layer comprises resin coated fibres.

PRIOR ART

One known method for producing liners for pressure containers is by blow moulding. The process of conventional blow moulding is well known in the art. The material to form a hollow or partly hollow article is provided in the form of a parison. A blow pin is inserted in the parison which is arranged in a mould cavity. Pressurized gas is fed into the parison through the blow pin forcing the parison to expand until it reaches the walls of the mould cavity.

For the blow moulding of generally bottle shaped containers with an elongated shape and an opening for filling and discharging arranged at one end thereof the parison normally has the form of a tube which is open at both ends. This parison is arranged over a blow pin and the mould cavity is closed around the parison so that the parison at both ends thereof is sealed gas tight by the closing of the mould cavity. The parison is accordingly squeezed or pinched and welded by the closing edges of the mould cavity. This area of the blow moulded object will, after the moulding process is completed, result in a so called pinch line in the moulded object. The material properties such as the thickness of the material will vary in the pinch line area compared to the areas remote from the pinch line. This uneven thickness may influence the reliability of the container to store fluid under pressure. Further the pinch line in the area surrounding the opening makes the outer surface of the moulded object uneven and non-smooth often with dents at the ends of the pinch line.

When blow moulding liners for composite pressure containers the boss is normally arranged around the opening remaining in the liner where the blow pin was inserted, which is the inlet/outlet opening to the internal volume of the liner and thereby of the container. In some embodiments, the liner is configured with more than one opening, for instance a cylindrical liner may have an opening at each end and a boss arranged at each opening. The boss is fastened to the liner by welding, gluing or by other means, and fixed in the area comprising the pinch line. The unevenness of the pinch line makes the securing of the boss to the liner difficult and providing a smoother outer surface surrounding the opening is desirable to make the installation of the boss more efficient.

In the conventional method, the rest of the parison situated outside the moulding cavity during moulding is removed from the moulded liner in a separate step. The removed part is referred to as scrap.

For liners prepared of a homogeneous polymer the scrap can be recycled by being grounded and fed as part of the polymer starting material to the extruder forming the parison. When preparing a liner from a parison of co-extruded layers of different polymer materials the scrap will not be homogeneous and the amount of scrap that can be recycled into one of the co-extruded layers is limited, as the composition of the layer to which the scrap is recycled has to be controlled to provide the layer with the intended properties.

From WO2016/059036 a method is known for preparing a pinch-line-free liner wherein the problem of avoiding a pinch line and the problems associated therewith are solved by avoiding pinching of the parison used for blow moulding within/by the moulding cavity and instead perform the pinching of the parison outside the mould by a separate shutter.

The pinching is performed by forcing the shutter elements towards each other accordingly pressure is applied to the outside of the parison, similarly as the prior art where the closing of the moulding cavity provides pressure to the outside of the parison by the moulding cavity elements being forced together with the parison arranged there between.

U.S. Pat. No. 5,217,729 discloses a mould for a plastic bottle with air passages for decompressing air in the cavity when the parison is expanded. During blow moulding little air is stagnated between the mould and the bottle surface which results in a high gloss bottle.

OBJECTIVES OF THE INVENTION

The present invention aims at providing a new alternative method of preparing a liner which is pinch line free at least in the area surrounding at least one opening of the final liner.

The present invention aims at providing an alternative way of keeping the parison in place within a closed mould without significantly influence the distribution of the material of the parison.

The present invention also aims at providing a method and apparatus applicable for use with continues extrusion of the parison.

A further objective is to provide a method that preferably can be performed faster and/or results in a reduction in the amount of scrap formed.

The present invention further aims at limiting the number of moving elements in the apparatus performing the blow moulding.

It is also an objective of the present invention to provide a method and apparatus capable of and adapted to prepare a liner made of a co-extruded parison comprising two or more co-extruded polymer layers.

It has now been found that it is possible to avoid the pinching of the parison in the blow moulding process and thereby avoiding the formation of a pinch line in the area surrounding the opening.

The present invention provides a method of blow moulding a container, wherein the method comprises the steps:

a) extruding a tube shaped, hollow, elongated from an extrusion head, wherein the parison comprises one free end;

b) closing a moulding equipment around the parison,
    wherein the moulding equipment comprises a moulding cavity and at least one aperture,
    wherein the at least one aperture provides an opening into the moulding cavity from outside the closed moulding equipment,
    wherein an excess section of the parison is arranged inside the at least one aperture,
    wherein the free end of the parison is kept in place in the moulding equipment opposite the at least one aperture;
c) holding the excess section of the parison in place within the at least one aperture by applying a holding force on the outside of the excess section of the parison;
d) cutting the parison outside the closed moulding equipment, thereby providing the parison with an open end adjacent to the at least one aperture;
e) arranging a blow pin within the open end of the parison such that said open end is closed by the blow pin;
f) blowing pressurised gas from the blow pin into the parison, thereby forming a blow moulded container within the moulding cavity.

The inventive solution comprises providing a moulding cavity with an aperture/opening adapted to result in a pinch line free container section. This can be obtained in that the circumference of the at least one aperture is larger than or equal to a circumference of the excess section of the parison. Alternatively, the moulding equipment may comprise guides that compress the parison when closing the moulding equipment but without pinching the parison so as to provide for obtaining a pinch line free blow moulded container. Thereby the parison can be arranged in the cavity without being pinched.

After having been arranged in the moulding cavity the tube shaped parison is kept in place in the opening and possibly expanded slightly by a holder providing a holding force, such as a vacuum provided in at least the opening into the moulding cavity.

A blow pin adapted to plug the open end of the tube shaped parison is arranged within the open tube and pressurized gas is blown by the blow pin into the parison so that it expands and is formed according to the moulding cavity.

In an aspect of the method the holding force in step c) is obtained
    applying a vacuum to the aperture on the outside of the parison, or
    by sending a pressurised gas impulse into the excess section thereby expanding the excess section to expand and adhere to a surface of the aperture, or
    by a parison catcher that grabs hold of at least part of the outside of the excess section of the parison, or
    if at least one part of the parison is magnetic by a magnet arranged adjacent to the aperture.

In one aspect the holding force results in an increase of the diameter of the parison in the excess section, thereby bringing it in close contact at least part of the surface of the aperture.

When using vacuum, a suction force on the parison is provided. The pressurised gas impulse can be emitted from the extrusion head, from a gas outlet arranged in the centre thereof. In one aspect, the same gas outlet can be used to pre-blow the parison as discussed below. The gas impulse is arranged to force the excess section of the parison into contact with the surface of the aperture by the blow force of the gas impulse.

The parison catcher, as used herein, refers to a mechanical arrangement that grabs hold of at least part of the excess section of the parison, it may comprise one or more clamps, tweezers, pins or similar instruments that holds the parison in position after the parison is cut and until the blow pin is arranged in the aperture.

In another aspect of the method of the present invention, the method further comprises, as part of step e) pinching the parison in the aperture with a circular pinch surface on the blow pin. Said pinching will contribute positively to the separating the excess scrap section from the blow moulded container in a later step.

In a further aspect of the method the free end of the parison is closed during step a) and the method further comprises supplying support air from the extrusion head to the hollow inside of the parison thereby providing a pre-blown parison. Providing the parison with a closed free end may for instance be obtained by using a cutter design to provide an open parison on one side of the cut and a closed parison on the other side of the cut. The support may be used to pre-blow the parison and to secure that parison is maintained hollow. The use of this aspect will depend on the material used, the extrusion temperature and the size of the container to be moulded.

In a further aspect of the method according to the present invention, the method further comprises
    g) removing the blow pin and thereby separating at least a part of the excess section from the blow moulded container,
    h) and opening the moulding equipment.

In one aspect, the removing of the blow pin and opening the moulding equipment results in the at least part of the excess section being removed from the blow moulded container due to the pinching in the further aspect of step e). The scrap in the form of the excess section is removed from the container as part of an automated step, which reduces and possible eliminates the need for a separate scrap removing step. The obtained pinch line free container may continue directly to the next processing step. If the container is a liner for a composite pressure container the next step could be securing a boss to the opening of the blow moulded container.

In another aspect of the method the parison is extruded continuously and wherein step d) provides a new parison with a free end extending from the extrusion head and wherein the method after step d) further comprises step
    d') moving the moulding equipment and the extrusion head away from each other by moving the moulding equipment and/or the extrusion head relative to each other.

The use of a continues extrusion provides an important advantage with respect to the efficiency of the process both with respect to the cycle time, the control of the extrusion process and limiting the amount of waste/scrap material. Continues extrusion provides process stability.

In a further aspect, the steps a) and b) are performed partly simultaneously or simultaneously. The extrusion continues while the moulding equipment is closed around the parison. The pre-blowing may also be performed partly simultaneously or simultaneously with steps a) and b).

In yet another aspect of the method the free end of the parison is kept in place in the moulding equipment opposite the at least one aperture by
    i) pinching the free end by the closing of the moulding equipment, or
    ii) pinching the free end after the closing of the moulding equipment by an external shutter, or iii) surrounding the free end with a second aperture and arranging a pin within an open end of the free end such that the open end is closed by the pin.

In embodiment i) the free end can either be closed or open when it is pinched by the closing of the moulding equipment.

In embodiment ii) an external shutter as disclosed in EP3206854 or similarly. The free end of the parison can either be closed or open when it is pinched by the external shutter. If the pinched area forms part of the formed container then the container will have a pinch line in this part of the container.

In embodiment iii) the free end of the parison is arranged in a second aperture arranged opposite the at least one aperture. This embodiment is especially applicable for producing a cylindrical container with an opening at each end thereof and adapted for mounting a boss at each end. Preferably the diameter of the second aperture is equal to or larger than the diameter of the parison to avoid pinching of the parison when the moulding equipment is closed around the parison. The pin used to close the open free end of the parison may when forced into the opening force the parison outwards towards the wall of the second aperture. In one aspect the pin may be an expandable blow pin as described in WO2014/124909. In the embodiment iii) no pinch line is formed in the section of the container comprising the second opening.

In a further aspect the pin is a second blow pin and the method comprises as part of step e) blowing pressurised gas through the second blow pin. According to this aspect pressurised gas is blown into the parison from both ends.

A person skilled in the art will also appreciate that in one embodiment all pressurised gas for performing the blow moulding is supplied by the pin in the second aperture.

In an embodiment of the invention the container is a liner for a composite pressure container.

The parison can be made of any type of extrudable and blow mouldable material. In one aspect of the present invention the parison comprises a thermoplastic material. The parison can be made of one material only, but it is a further advantage of the present invention that the parison can be made of two or more co-extruded materials. Preferably one of said materials is a thermoplastic material. When using a co-extruded parison a multilayer container is obtained.

The term "partly simultaneously" as used herein describes the situation wherein method steps partly coincide in time so that at one point in time two or more steps are performed simultaneously whereas at another point in time only one of the method steps may be performed. For instance, the extrusion of the parison may be continuously whereas other steps are performed in certain intervals which will overlap with the extrusion but only partly or not fully overlap with each other.

The present invention further provides an apparatus for blow moulding comprising
- an extrusion head for extrusion of a tube shaped, hollow, elongated parison;
- a reversible closable moulding equipment comprising a moulding cavity and at least one aperture, wherein the at least one aperture provides an opening into the moulding cavity from outside the closed moulding equipment, wherein the circumference of the at least one aperture is larger than or equal to a circumference of a parison providable from the extrusion head, or the moulding equipment comprises one or more guides arranged to compress the parison to fit within the aperture, wherein said guides are structured to result in a pinch line free parison
- a holder for providing a holding force on the parison to be arranged in the aperture;
- a cutter adapted for cutting the parison extruded from the extrusion head; and
- a blow pin adapted to be inserted into the aperture and comprising a gas supply conduit for providing pressurised gas into the moulding cavity.

In another aspect of the apparatus the cutter is adapted for providing a closed parison end extending from the extrusion head and an open parison end adjacent to the at least one aperture. In an embodiment according to this aspect the apparatus comprises a support air supply for supplying support air from the extrusion head to the hollow inside of the parison.

In another aspect of the apparatus the blow pin comprises a circular pinch surface adapted to pinch a parison against a surface of the aperture. By providing a circular pinch surface the apparatus is adapted to assist the separation of excess scrap from the blow moulded container when the moulding equipment is opened to release the moulded part.

In yet another aspect of the apparatus the moulding equipment and the extrusion head are arranged movable relative to each other. This allows for the use of a continuously extrusion with one or more moulding equipment being used to receive and blow mould sections of the continuous parison according to the present invention.

In a further aspect of the apparatus the holder comprises a vacuum supply for supplying a vacuum to an external surface of a parison or
- a gas outlet in the centre of the extrusion head adapted for sending a pressurised gas impulse into the excess section thereby expanding the excess section to expand and adhere to a surface of the aperture, or
- a parison catcher that grabs hold of at least part of the outside of the excess section of the parison, or
- a magnet arranged adjacent to the aperture.

In yet another aspect of the apparatus the moulding equipment and the blow pin are arranged to be moved relative each other and the circular pinch surface and the aperture is adapted to pinch a parison to an extend such that the movement results in cutting a moulded container along said pinch.

Extrusions heads including cutters are well known to a person skilled in the art of thermoplastic extrusion. In the apparatus, the cutter is arranged to cut and provide a closed end on the end remaining connected to the extrusion head and an open end on the parison end no longer connected to the extrusion head. Different types of cutters are for instance discussed in "Technology of Plastics Packaging for the Consumer Market" by Geoff A. Giles, David R. Bain, 2001, pages 35-36.

The method and apparatus according to the present invention can also be applied to produce liners for pressure containers including the features disclosed in EP1725799 for avoiding build up electrostatic pressure.

BRIEF DESCRIPTION OF THE DRAWINGS

The present invention will be described in further detail with reference to the enclosed drawings wherein FIG. 1 a schematic representation of an extrusion head.

FIG. 2 shows a pre-blown parison during extrusion.

FIG. 3 shows an embodiment of a moulding equipment with holder.

FIG. 10 illustrates an extrusion head with a parison with an open free end.

FIG. 11 shows an extrusion head with a parison without pre-blowing.

Figure 4:
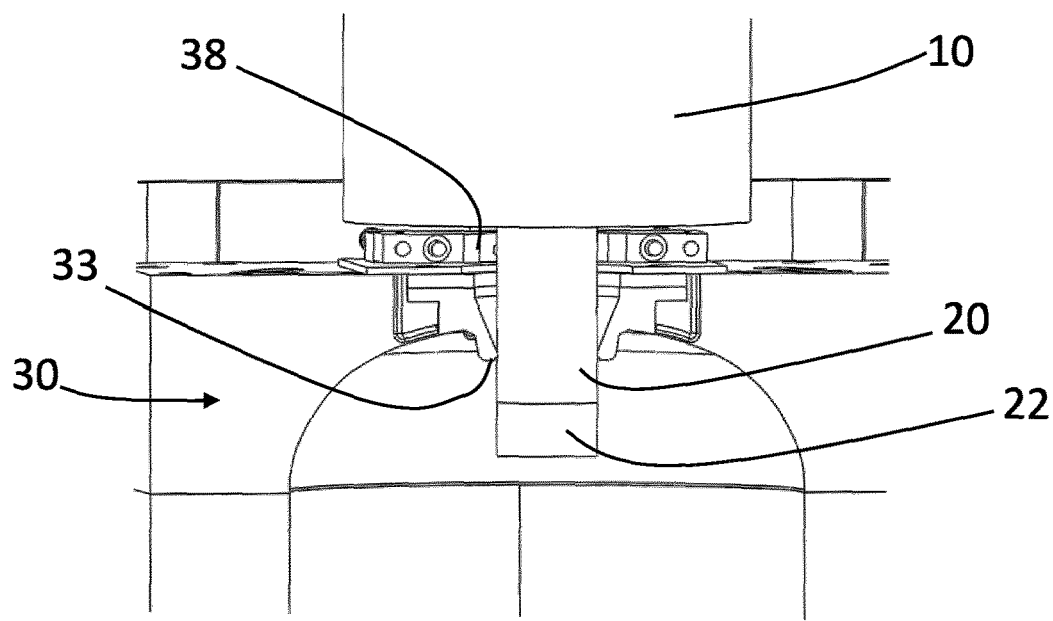
FIG. 4 shows extrusion of parison into a moulding equipment.

In the figures sections of the moulding equipment have been removed for illustrative purposes.

PRINCIPAL DESCRIPTION OF THE INVENTION

The present invention will be described with reference to the enclosed figures which illustrate one embodiment of the invention. The sequence of the figures is selected to illustrate stages during performing of the method.

FIG. 1 illustrates the extrusion head 10 with a parison 20 being extruded therefrom. The free end 22 of the parison is closed. In FIG. 2 the extrusion has proceeded further and support air has been supplied from the extrusion head to the parison which has a pre-blown section 24. The support air functions to assist maintaining a hollow parison and limit the risk of the parison collapsing. The need for addition of support air will depend on the properties of the extruded material and of the axial length of the container to be produced. For short containers with axial lengths below 40 cm support air may not be necessary whereas for larger containers it may be beneficial to control the shape of the parison.

FIG. 3 illustrates one halve of a moulding equipment 30 defining parts of the moulding cavity 31. The aperture 32 is arrange in the top and a semi circular pinch surface 33 at the entrance to the aperture. On the side of the aperture opposite the moulding cavity a holder 38 is arranged. In the illustrated embodiment the holder comprises vacuum openings 39. The moulding equipment in this embodiment comprises two similar halves that are joint to form a moulding cavity with an aperture with a circular pinch surface where the aperture meets the moulding cavity.

Figure 5:
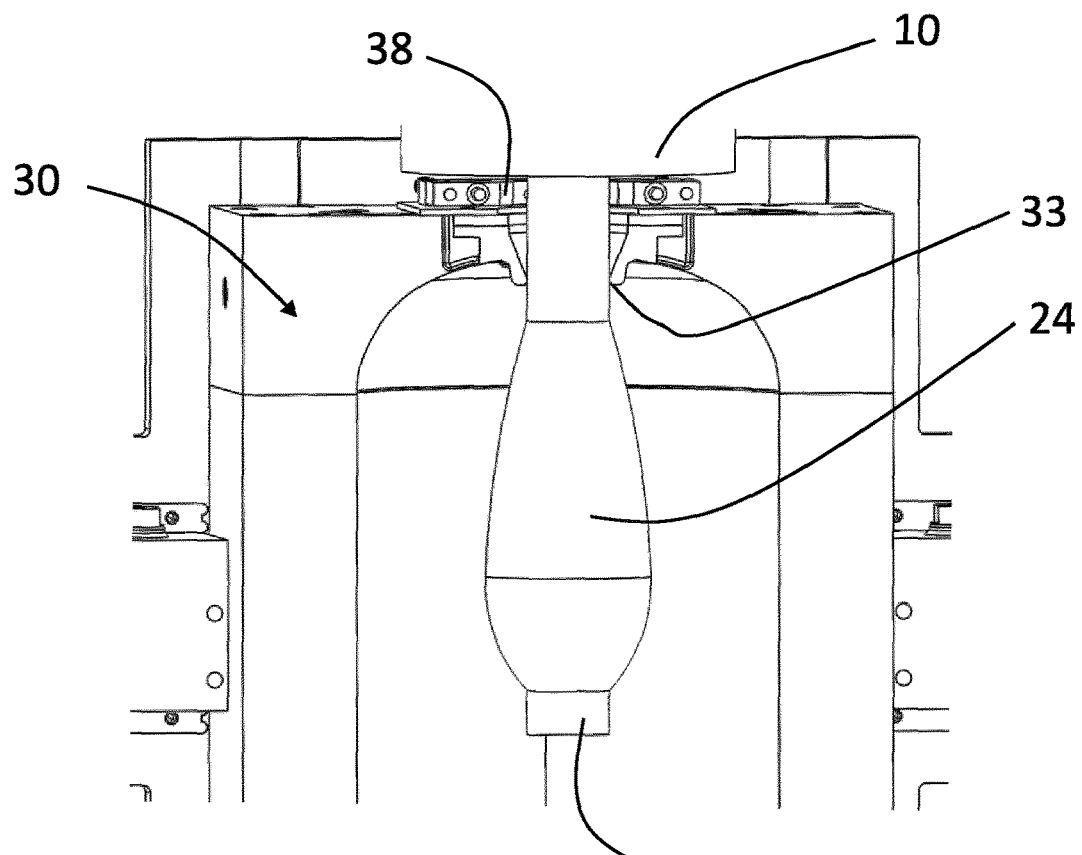
FIG. 5 illustrates a pre-blown parison within a moulding equipment.

FIGS. 4 and 5 illustrates the extrusion of the parison 20 into the moulding equipment, wherein on FIG. 5 a pre-blown parison is illustrated.

Figure 6:
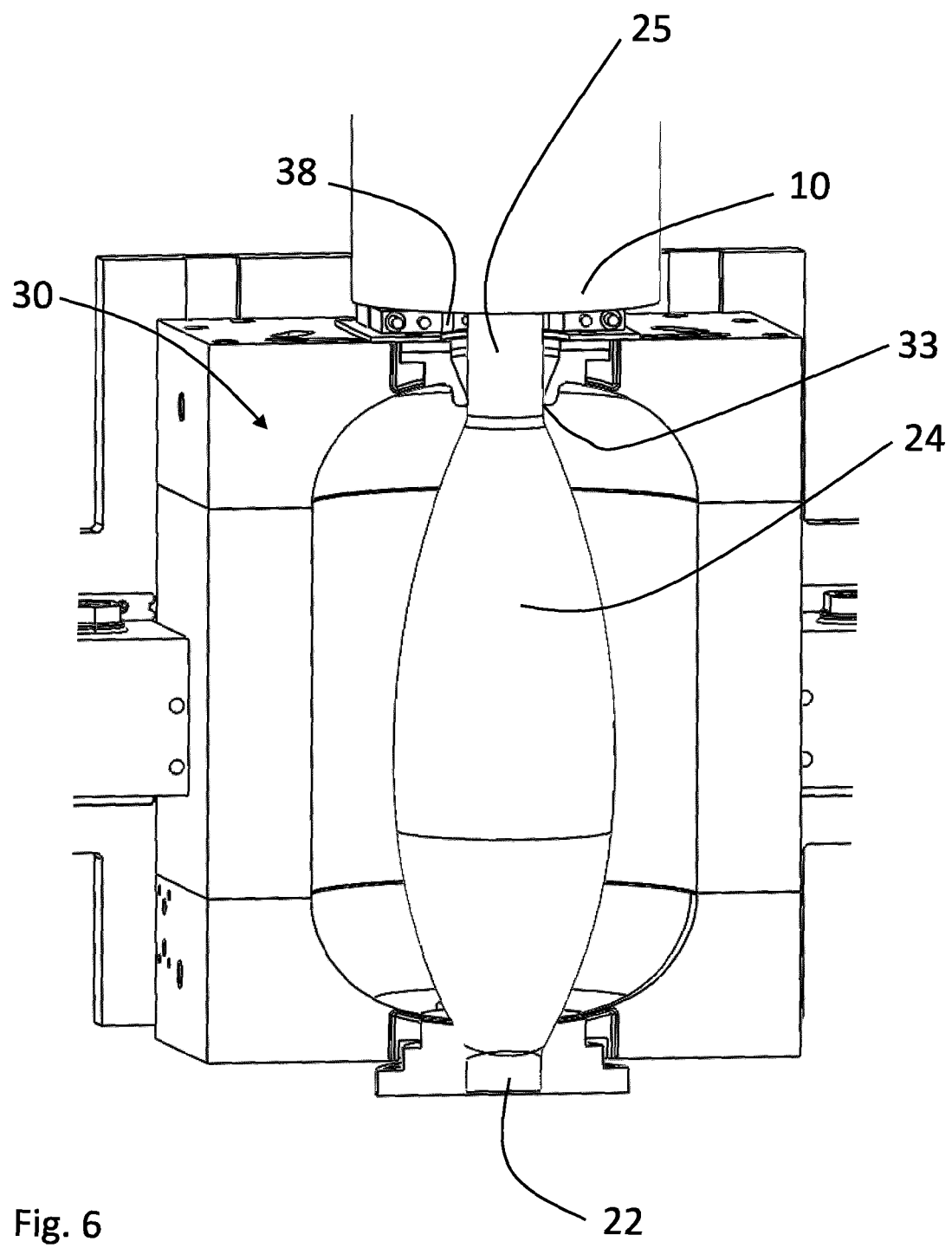
FIG. 6 illustrates a completed extruded parison within a moulding equipment.

FIG. 6 illustrates the situation at the time of closing of the moulding equipment around a in this embodiment pre-blown parison 24. The closed free end 22 is situated just outside the moulding cavity and will be pinched between the two halves of the moulding equipment. The figure shows the excess section 25 of the parison which is arranged within the aperture.

Figure 7:
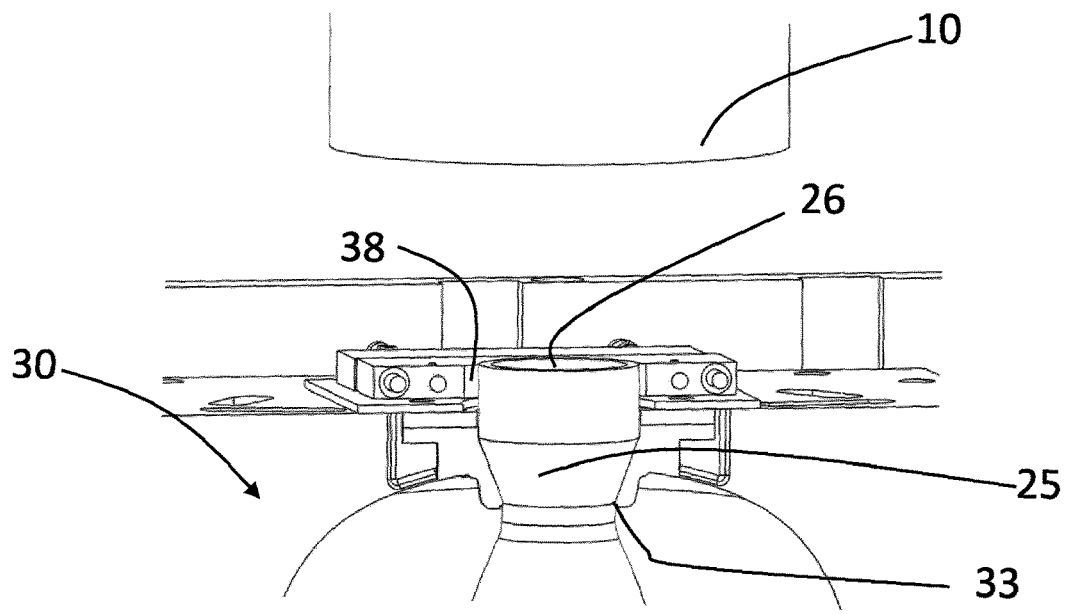
FIG. 7 illustrates a parison after cutting maintained in position by a holder.

For illustrative purposes FIG. 7 only shows a section of the closed moulding equipment. On FIG. 7 the holder 38 has been engaged which has resulted in a slight increase in the diameter of the excess section 25 of the parison and the cutter arranged with in the extrusion head has been activated to separate the parison. Thereby forming the open end 26 of the parison. The movement of the extrusion head 10 relative to the moulding equipment 30 has begone.

Figure 8:
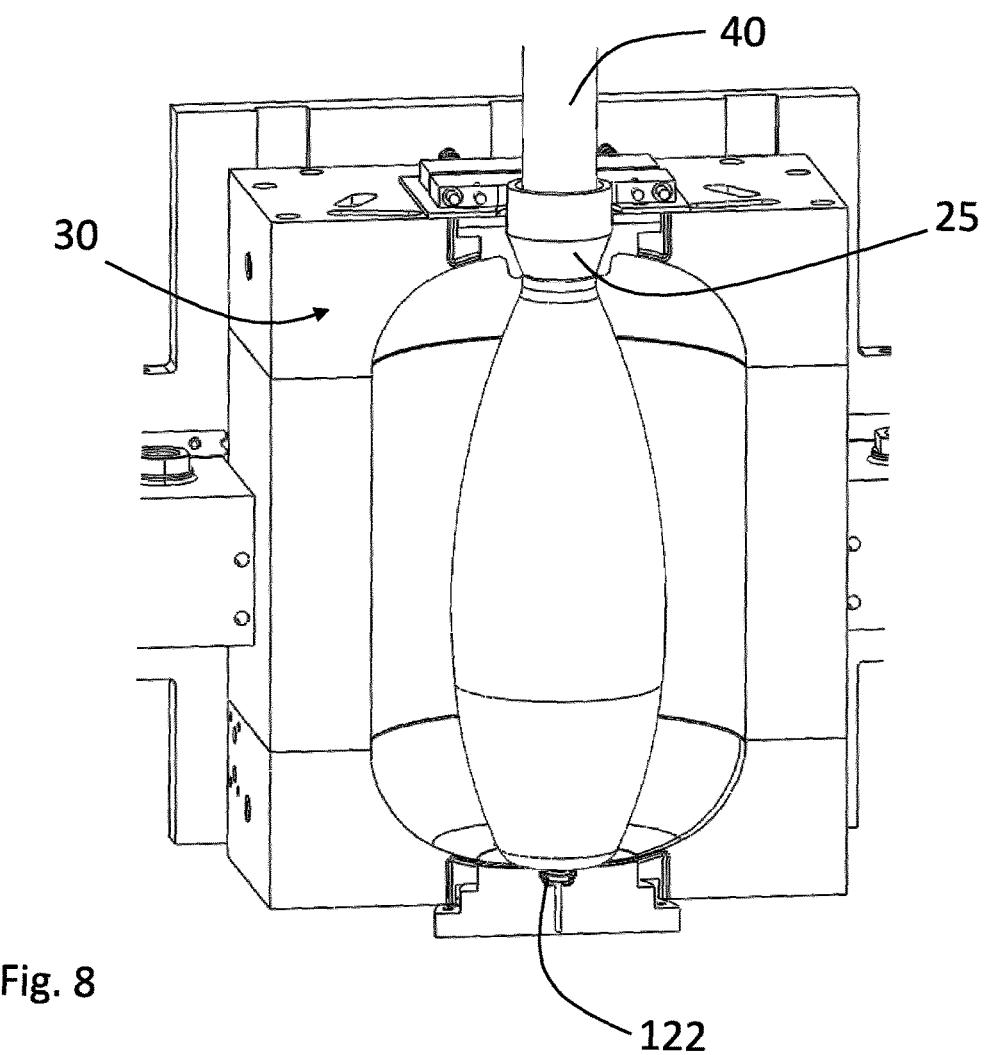
FIG. 8 illustrates a blow pin inserted in the parison.
Figure 9:
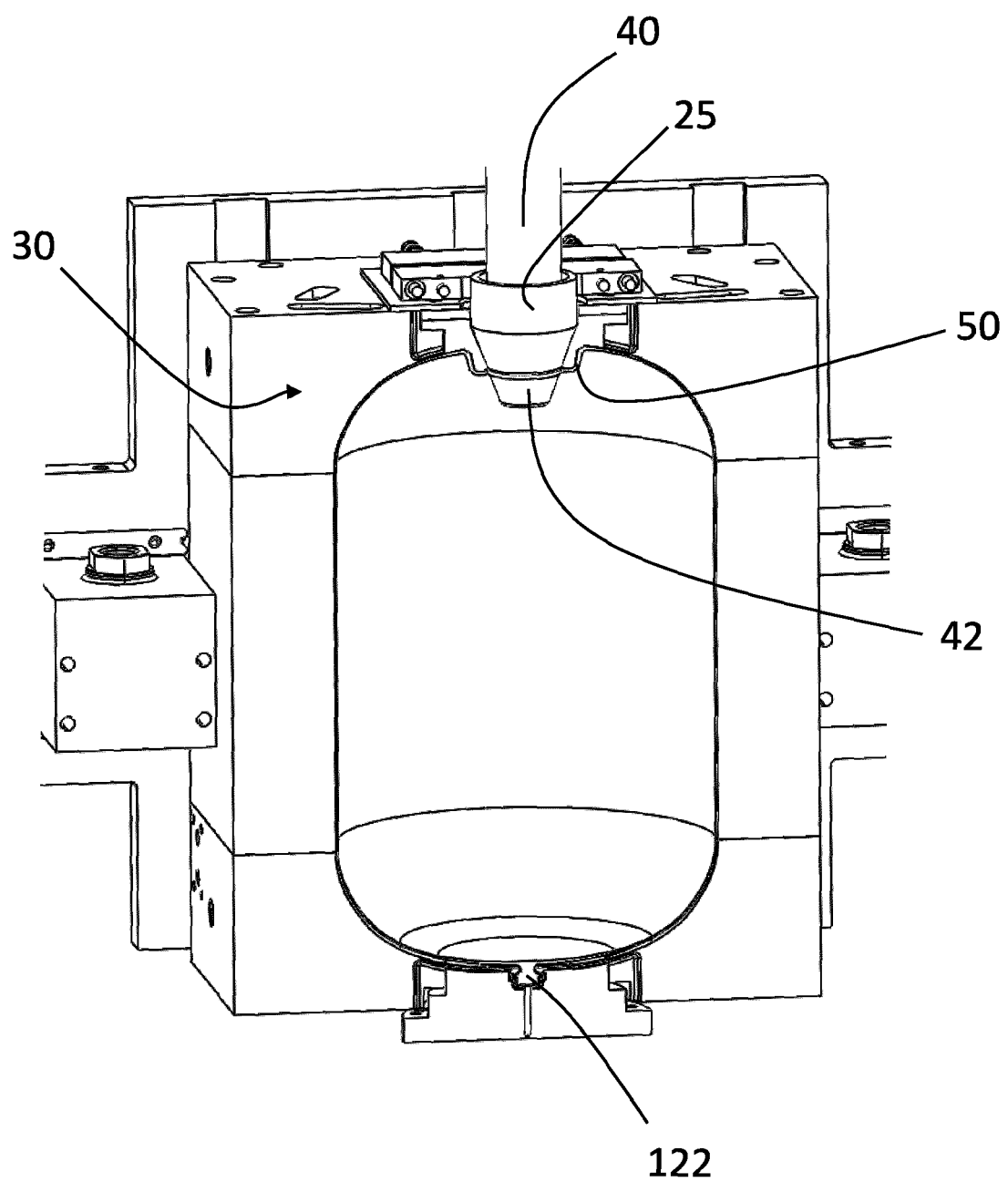
FIG. 9 illustrates the situation after completion of the blow moulding.

For illustrative purposes FIG. 8 only shows a section of the closed moulding equipment. On FIG. 8 a blow pin 40 has been entered into the opening of the parison. FIG. 8 also illustrates one embodiment of the opposite end where the end 122 of the parison has been pinched by the closing of the moulding equipment. Pressurised air is blown from the blow pin 40 into the hollow inside of the parison until the situation illustrated on FIG. 9, showing a cross sectional view of the moulding equipment 30 and the formed container 50. The container 50 is formed with an outer surface defined by the moulding cavity. The tip 42 of the blow pin s visible as it was inserted through the excess section and into the moulding cavity.

FIGS. 10 and 11 are similar to FIGS. 1 and 2 both with and embossment of the parison with an open free end 23.

| Reference numbers: | |
|---|---|
| 10 | Extrusion head including cutter |
| 20 | Parison |
| 22 | Closed end of parison |
| 122 | Pinched closed end of parison |
| 23 | Open free end of parison |
| 24 | Pre-blown parison |
| 25 | Excess section |
| 26 | Open end of parison |
| 30 | Moulding equipment |
| 31 | Moulding cavity |
| 32 | Aperture |
| 33 | Surface of aperture |
| 38 | Holder |
| 39 | Vacuum opening |
| 40 | Blow pin |
| 42 | Tip of blow pin |
| 50 | Container |

The invention claimed is:

1. A method of blow molding a container, the method comprising:
   a) extruding a tube shaped, hollow, elongated parison from an extrusion head, wherein the parison comprises one free end;
   b) closing a molding equipment around the parison, wherein the molding equipment comprises a molding cavity and at least one aperture having a pinch surface at an entrance thereof,
   wherein the at least one aperture provides an opening into the molding cavity from outside the closed molding equipment, wherein an excess section of the parison is arranged inside the at least one aperture, and
   wherein the one free end of the parison is kept in place in the molding equipment opposite the at least one aperture;
   c) holding the excess section of the parison in place within the at least one aperture by applying a holding force on an outside of the excess section of the parison;
   d) cutting the parison outside the closed molding equipment, thereby providing the parison with an open end adjacent to the at least one aperture;
   e) arranging a blow pin within the open end of the parison such that the open end of the parison is closed by the blow pin; and
   f) blowing pressurized gas from the blow pin into the parison, thereby forming a blow molded container within the molding cavity.

2. The method according to claim 1, wherein the holding force in step c) is obtained by:
   applying a vacuum to the at least one aperture on the outside of the parison;

sending a pressurized gas impulse into the excess section of the parison thereby expanding the excess section of the parison so as to adhere to a surface of the at least one aperture;
a parison catcher that grabs the outside of the excess section of the parison; or
a magnet arranged adjacent to the at least one aperture.

3. The method according to claim 1, further comprising, as part of step e), pinching the parison at the pinch surface of the at least one aperture with a circular pinch surface on the blow pin.

4. The method according to claim 1, wherein the one free end of the parison is closed during step a) and the method further comprises supplying support air from the extrusion head to the hollow inside of the parison thereby providing a pre-blown parison.

5. The method according to claim 1, further comprising:
g) removing the blow pin and thereby separating at least a part of the excess section of the parison from the blow molded container; and
h) opening the molding equipment.

6. The method according to claim 1, wherein the parison is extruded continuously and step d) provides a new parison with a free end extending from the extrusion head and wherein the method after step d), further comprises:
d') moving the molding equipment and the extrusion head away from each other by moving the molding equipment and/or the extrusion head relative to each other.

7. The method according to claim 1, wherein steps a) and b) are performed at least partly simultaneously.

8. The method according to claim 1, wherein the one free end of the parison is kept in place in the molding equipment opposite the at least one aperture by:
i) pinching the one free end of the parison by the closing of the molding equipment;
ii) pinching the one free end of the parison after the closing of the molding equipment by an external shutter; or
iii) surrounding the one free end of the parison with a second aperture and arranging the blow pin within an open end of the one free end of the parison such that the open end of the one free end of the parison is closed by the blow pin.

9. The method according to claim 8, wherein the one free end of the parison is kept in place in the molding equipment opposite the at least one aperture by surrounding the one free end of the parison with the second aperture and arranging a second blow pin within the open end of the one free end of the parison such that the open end of the one free end of the parison is closed by the second blow pin, and
wherein the method comprises, as part of step e), blowing pressurized gas through the second blow pin.

10. The method according to claim 1, wherein the parison is made of one or more thermoplastic materials.

11. An apparatus for blow molding, the apparatus comprising:
an extrusion head for extrusion of a tube shaped, hollow, elongated parison;
a reversible, closable molding equipment comprising a molding cavity and at least one aperture having a pinch surface at an entrance thereof, wherein the at least one aperture provides an opening into the molding cavity from outside the molding equipment when the molding equipment is closed,
wherein a circumference of the at least one aperture is larger than or equal to a circumference of the parison, or the molding equipment comprises at least one guide arranged to compress the parison to fit within the at least one aperture, wherein the at least one guide is structured to result in the parison being pinch line free;
a holder for providing a holding force on the parison which is to be arranged in the at least one aperture;
a cutter adapted for cutting the parison; and
a blow pin adapted to be inserted into the at least one aperture and comprising a gas supply conduit for providing pressurized gas into the molding cavity.

12. The apparatus according to claim 11, wherein the cutter is adapted to provide a closed parison end extending from the extrusion head and an open parison end adjacent to the at least one aperture.

13. The apparatus according to claim 12, further comprising a support air supply for supplying support air from the extrusion head to the hollow inside of the parison.

14. The apparatus according to claim 11, wherein the blow pin comprises a circular pinch surface adapted to pinch the parison against the pinch surface of the at least one aperture.

15. The apparatus according to claim 11, wherein the molding equipment and the extrusion head are movable relative to each other.

16. The apparatus according to claim 11, wherein the holder comprises:
a vacuum supply for supplying a vacuum to an external surface of parison;
a gas outlet positioned in a center of the extrusion head and adapted to send a pressurized gas impulse into an excess section of the parison thereby expanding the excess section of the parison so as to adhere to a surface of the at least one aperture;
a parison catcher adapted to grab hold of at least part of an outside of the excess section of the parison; or
a magnet arranged adjacent to the at least one aperture.

17. The apparatus according to claim 14, wherein the molding equipment and the blow pin are movable relative each other and the circular pinch surface of the blow pin and the at least one aperture are adapted to pinch the parison such that the movement results in cutting a molded container along a pinch line.

* * * * *